United States Patent [19]
Richards

[11] 3,776,365
[45] Dec. 4, 1973

[54] FLUID BLOW-OFF SILENCER

[75] Inventor: John F. Richards, Santa Paula, Calif.

[73] Assignee: Fluid Kinetics Corporation, Ventura, Calif.

[22] Filed: Jan. 14, 1972

[21] Appl. No.: 217,857

[52] U.S. Cl. .................................. 181/50, 181/55
[51] Int. Cl. ............................................. F01n 1/10
[58] Field of Search ................. 181/33 GA, 55, 71, 181/47 B, 36 C, 37, 47 R, 57, 42, 50

[56] References Cited
UNITED STATES PATENTS

| | | | |
|---|---|---|---|
| 2,392,559 | 1/1946 | Varma | 181/50 |
| 226,905 | 4/1880 | Curie | 181/71 |
| 3,642,095 | 2/1972 | Fujii | 181/47 B |
| 1,612,212 | 12/1926 | Peano | 181/33 GA |
| 1,229,434 | 6/1917 | Flockhart | 181/47 B |
| 2,466,001 | 4/1949 | Burwell | 181/33 GA |
| 3,073,684 | 1/1963 | Williams | 181/55 |
| 3,454,129 | 7/1969 | Everett | 181/47 B |
| 3,635,309 | 1/1972 | Nemcansky et al. | 181/55 |

FOREIGN PATENTS OR APPLICATIONS

| | | | |
|---|---|---|---|
| 22,089 | 1907 | Great Britain | 181/55 |
| 1,292,669 | 4/1969 | Germany | 181/47 B |
| 10,047 | 1891 | Great Britain | 181/55 |
| 18,155 | 1904 | Great Britain | 181/55 |

Primary Examiner—Richard B. Wilkinson
Assistant Examiner—John F. Gonzales
Attorney—B. G. Nilsson et al.

[57] ABSTRACT

A generally-cylindrical blow-off silencer is disclosed to be used, for example, on a vent, as from a high-pressure fluid system. A diffuser unit receives fluid from the vent and divides it into a multiplicity of separate streams which are directed radially to impinge upon a housing that is lined with acoustic material, at least a portion of which material is provided to dampen the housing. Scoria (light-weight, permeable, porous mineral) is disclosed as a liner pack, to dampen, seal and absorb sound-energy, in combination with glass-fiber material, which also is employed in an acoustic-core structure.

5 Claims, 2 Drawing Figures

PATENTED DEC 4 1973

3,776,365

FLUID BLOW-OFF SILENCER

BACKGROUND AND SUMMARY OF THE INVENTION

Fluid systems of various types frequently include a vent or "blow-off" structure, for releasing pressurized fluid to the atmosphere under certain circumstances. Exemplary of such structures are: safety valves, relief valves, turbine exhausts and other structures that release fluid in various relationships to time.

One of the problems that is frequently associated with blow-off structures is the noise attendant their operation. For example, the release of fluid under pressure may involve turbulent noise with or without shock noise, depending upon the pressure ratios that are involved. Although individual characteristics and demands may vary, a considerable need exists for an improved acoustical system, that may be employed to reduce the noise attendant the operation of a blow-off structure during the release of a fluid stream.

In providing the blow-off silencer, several considerations are pertinent. For example, it is generally important that the silencer freely allow the passage of fluid so as to avoid the development of significant internal pressures. It is also important that the silencer does not itself become a source of noise. For example, in some applications, a sudden burst of fluid, released from a high-pressure source may actuate a silencer housing, causing it to "ring" like a bell. In many applications, the silencer also must withstand exposure to relatively high-temperature fluids. Finally, perhaps more general considerations include: the effectiveness of the silencer, its cost of production, the practicality of its use, its ease of installation, and its maintenance requirements.

In general, the present invention is directed to an improved blow-off silencer which offers little impedance to fluid flow, may be constructed to withstand elevated temperatures and is effective and economical. The silencer incorporates a diffuser for dividing the blow-off stream of fluid into a multiplicity of small radial streams which are directed in an expansion chamber to impinge upon an acoustic lining pack of energy-absorbing material. The structure incorporates an external housing, which is lined by the acoustic energy-absorbing material, part of which (scoria) serves both to absorb acoustic energy and to dampen the housing. Additional lining in a pack, is separated by a housing seal and is provided in the form of glass fiber material, which may also be employed in a core structure, concentrically mounted in the housing to permit the relatively-free passage of released fluid.

BRIEF DESCRIPTION OF THE DRAWINGS

In the drawing, which constitutes a part of this specification, an exemplary embodiment exhibiting various objectives and features hereof, is set forth, specifically.

DESCRIPTION OF THE ILLUSTRATIVE EMBODIMENT

As required, a detailed illustrative embodiment of the invention is disclosed herein. The embodiment merely exemplifies the invention which may, of course, be constructed in various other forms, some of which may be somewhat different from the disclosed illustrative embodiment. However, specific structural and functional details disclosed herein are merely representative and in that regard provide a basis for the claims herein which define the scope of the invention.

Figure 1:
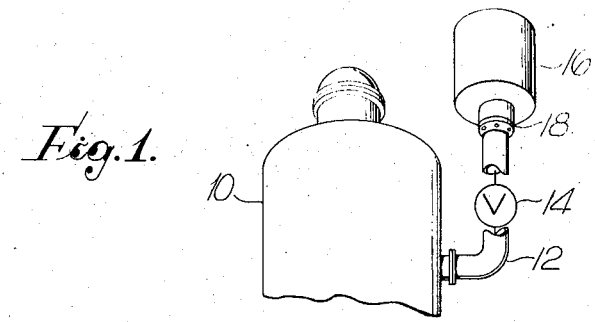
FIG. 1 is a perspective view of a fragment of a system incorporating a blow-off silencer in accordance herewith.

Referring initially to FIG. 1, there is shown a tower structure 10 (of a high-pressure fluid system) incorporating a blow-off stack 12 containing a relief valve 14 (symbolically represented). At its upper end, the stack 12 is terminated by a blow-off silencer 16, constructed in accordance herewith. Generally, as indicated, the silencer 16 is affixed coaxially to the stack 12 by a flange coupling 18. It is to be noted that the silencer 16 may be mounted horizontally, as well as vertically, and accordingly, angular offsets are not particularly critical considerations.

In the operation of the structure, as indicated in FIG. 1, the tower 10 may contain fluid, e.g. steam, high-pressure gas, or the like, which under certain conditions is exhausted (for various intervals) to the atmosphere through the stack 12. The valve 14 may be opened under circumstances and by controls that are not particularly pertinent to the structure hereof. When the valve 14 is opened, fluid is released from the structure 10, to be discharged to ambient pressure.

Generally, a stream of high-velocity fluid that is discharged into a relatively-stationary gas results in jet noise that may vary in characteristics. The jet noise may be simply turbulence, or may further include shock noise, in the event that certain critical pressure ratios exist. Such noise in the presence of people results in reduced working efficiency for those in the proximity of the structure, as well as contributing to general noise levels at remote locations, which disturb and distract personnel and populace.

Figure 2:
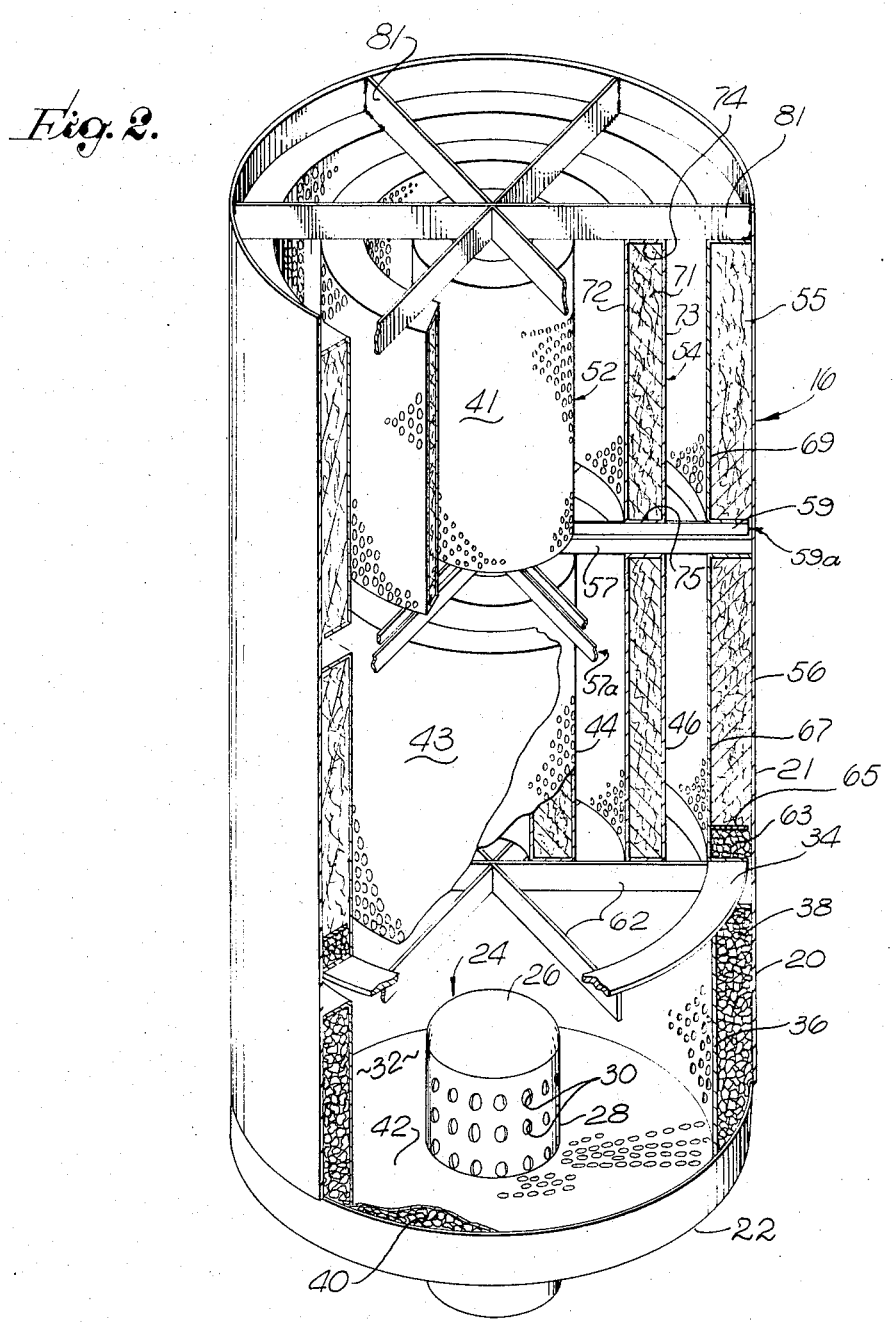
FIG. 2 is a sectionalized perspective view of the silencer illustrated in FIG. 1.

In accordance herewith, the silencer 16 passes fluid from a stack 12 with little obstruction, while attenuating the noise resulting from the fluid discharge. Specifically, as disclosed in detail below, the system accomplishes attenuation by: shifting the frequency of the noise (to a more efficient attenuation level) and absorbing the acoustic energy at the altered frequency while dampening the housing of the silencer. Considering the blow-off silencer 16 in greater detail, reference will now be made to FIG. 2 in which the internal details of the silencer are illustrated.

The silencer 16 is provided in a housing 20 which is substantially open at the top, and is closed at the bottom. Specifically, a cylinder 21 is closed at the bottom (as shown) by a dashed end 22. The housing 20 may comprise various materials, as steel and aluminum, to provide a rigid shell structure. Generally, plate material of significant thickness has been found desirable in many applications.

The bottom or lower end 22 of the housing 20 concentrically receives a diffuser 24 comprising a closed top dome 26 and a cylindrical section 28. The lower end of the cylinder section 28 extends out of the housing 20 and affords a coupling to receive the blow-off stream. The upper portion of the section 28 extends into an expansion chamber 32 and is perforated by a multiplicity of holes 30, the total area of which is greater than the cross sectional area of the cylindrical section 28. It is noteworthy that the holes 30 extend radially with regard to the cylindrical configuration of the silencer 16.

Substantially the entire interior of the silencer 16 is lined with acoustic energy-absorbing material. Specifically, the lower portion of the silencer 16 (comprising the expansion chamber 32) is lined with sound energy absorbing, permeable, mineral particles, while the upper portion is lined with glass fibers. Concentrically within the expansion chamber 32, a perforated cylindrical metallic liner wall 36 defines an annular space that receives granular energy-absorbing particles 38. A similar layer of the particles 40 is provided between the end 22 and a facing perforated metallic circular liner wall 42. The liner walls 36 and 42 may comprise heavy-gauge sheet metal, e.g. steel, perforated to effectively hold the packs of particles 38 and 40, while providing the desired acoustic performance.

The acoustic layer particles 38 and 40 may comprise any of a variety of light-weight porous acoustic energy-absorbing minerals, e.g. scoria—a slaglike pyroclastic ejecta markedly vesicular. The material in alternative forms should be light-weight, permeable to fluid, non-compacting and able to withstand elevated temperatures. Generally, it also is important that the material in the layers of particles 38 and 40 directly engage the interior of the housing 20 in order to provide dampening against ringing.

Above the expansion chamber 32, a pair of acoustic sections 41 and 43 are provided which contain cores 44, 46, 52 and 54. One or several sections may be used in various embodiments. The acoustic section 41 includes an upper pack 55 while the section 43 has a lower pack 56, both of cylindrical configuration conformed to the walls of the cylinder 21.

The acoustic section 41 is separated from the expansion chamber 32 by: a spacer ring 34, extending about a spider of radial bars 62 and a labyrinth seal 63. The ring 34, and a similar ring 65 (immediately above) are affixed (as by welding) to a cylindrical, perforated facing 67 to define an annular space which contains scoria (in the illustrative embodiment) to function as the labyrinth seal 63. Generally, the seal 63 restricts the flow of high velocity air along the inside surface of the cylinder 21 which would otherwise blow the glass fibers out of the pack 56 through the perforated facing 67. It is to be noted, that the rings 34 and 65 have an outside diameter that is smaller than the inside diameter of the cylinder 21, to accommodate temperature-size changes. Yet, the space is effectively closed by the particles in the labyrinth seal 63.

The upper pack 55 is separated from the lower pack 56 by radially-extending bars 57 and 59, comprising a pair of spaced-apart spiders 57a and 59a. The lower spider 57a is welded to the housing 20 and supports the elements therebelow. The gap or space between the spiders 57a and 59a accommodates temperature related dimensional changes. That is, the bars 57 are affixed to the cylinder 21 along with the bars 81 which support the cores 44, 46, 52 and 54 (along with the packs 55 and 56). However, the bars 59 are not so fixed.

The cores 44, 46, 52 and 54 may be of a structure quite similar to the packs 55 and 56, i.e. glass fiber layers closed by apertured facings. Specifically, as exemplified by the core 54 (upper external) each includes a glass fiber packing 71 held between a pair of concentric cylindrical facing walls 72 and 73 which are joined, top and bottom by a pair of flat rings 74 and 75.

In the manufacture of the silencer as disclosed herein, the housing 20 may comprise cylindrically-formed plate while the end 22 may be stamped or otherwise formed of similar material. Th diffuser 24 may comprise a length of high-pressure pipe, capped by the dome 26 welded in position to withstand high pressures. Various techniques for boring the holes 30 in the diffuser 24 are well-known in the machining art. The diffuser 24 and the cylindrical housing 20 may be affixed in concentric relationship to the end 22 as by welding to accomplish an integral structure. The cylindrical liner wall 36 and the bottom liner wall 42 may be affixed together as a sub-assembly prior to placement within the housing 20, with the material layers 38 and 40 therebetween.

Generally, the acoustic packs 55 and 56, along with the cores 44, 46, 52 and 54 may be formed as an integral sub-assembly for subsequent insertion within the housing 20. Specifically, each of the cores, including the acoustic interior packing 71 contained between concentric walls 72 and 73 may be first separately formed. The walls 72 and 73 are perforated to hold the interior packing 71 while affording the desired acoustical energy absorbing characteristics. Generally, the interior packing 71 may comprise fiber glass, light-weight minerals as scoria or vermiculite, stainless-steel spinnings, or other acoustic energy-absorbing materials.

In a sub-assembly operation, after forming the individual cores 44, 46, 52 and 54 (as by metal shaping and welding techniques) the cores are fastened together between the sets of radial bars, e.g. bars 62, 57 and 81 along with the acoustic packs 55 and 56. Thereafter, the sub-assemblies may be placed within the housing 20 with the seal 63 filled with particles. Next, the bars 81 are welded to the cylinder 21 to support the internal structure.

In the operation of the silencer 16, upon the occurrence of a blow-off, the diffuser 24 receives the full impact of the fluid stream and separates that stream into a multiplicity of individual streams, directed to impinge upon the cylindrical wall of the expansion chamber 32. The division of the single stream into a multiplicity of separate streams, shifts the frequency to higher levels at which the acoustic-energy absorbing materials are more efficient. Additionally, the diffuser 24 decouples the silencer 16 from the fluid system (stack 12) to avoid resonance situations. Also, the diffuser 24 accomplishes a transition into the expansion chamber 32, thereby reducing the flow turbulence.

The fluid streams from the diffuser 24 are directed to impinge upon the lined expansion chamber 32 which, as indicated above, contain the layers of particles 38 and 40. These layers function not only to absorb acoustic energy but additionally to deaden or dampen the housing 20 against ringing. It is to be noted that the labyrinth seal 63 (above the particles 38) prevents the fluid streams from forcefully moving in, and behind the pack 56. Otherwise, forces would be created to displace the energy-absorbing material in the packs.

Above the expansion chamber 32, the acoustic packs 55 and 56 function in combination with the acoustic cores 44, 46, 52, and 54 to attenuate sound by absorbing the acoustic energy. Specifically, the annular acoustic cores 44, 46 52 and 54 provide absorptive silencing to achieve effective attenuation. The concentric annular core configuration enables effective control over packing depth, while avoiding thick and thin spots which tend to decrease packing efficiency. The combined components, including the diffuser, the expansion chamber, the acoustic pack and the acoustic cores tends to afford a significantly improved combination for the effective reduction of undesired noise attendant a fluid stream. The utilization of the particle material, and specifically scoria as disclosed, has been determined to be very effective regarding the durability of the silencer. Specifically, scoria has good sound-attenuating characteristics, is relatively inexpensive, and tends to resist settling or compressing, so as to maintain effective physical contact with the housing for dampening purposes. Of course, various other materials and structures may be employed herein in accordance with the principles hereof, and accordingly, the scope hereof is deemed to be as defined by the claims as follow.

What is claimed is:

1. A blow-off silencer for use on a fluid-discharge passage, for passing a fluid stream to ambient, comprising:
   a generally cylindrical housing having a cross sectional area greater than that of said passage and adapted to be connected to receive said fluid stream;
   a diffuser unit affixed at one end of said housing for receiving said fluid stream and for dividing said stream into a multiplicity of separate streams;
   a perforated liner, spaced apart from a portion of said housing at said one end, to define an annular space between said housing and said liner and also defining an unobstructed open space extending from said diffuser unit through said housing;
   a pack of granular energy-absorbing particles disposed in said annular space to contact said housing; and
   at least one, substantially cylindrical energy-absorbing structure fixed in said open space of said housing and extending adjacent the opposed end of said housing to define an unobstructed open passage from said diffuser unit through said housing for passing said separate streams to ambient.

2. A blow-off silencer according to claim 1 wherein one of said energy-absorbing structures conforms to an interior wall of said housing and further includes a terminal annulus of granular particles for closing an end of said one structure.

3. A blow-off silencer according to claim 1 including a plurality of substantially cylindrical, energy-absorbing structures affixed in concentric, spaced-apart relationship within said housing.

4. A blow-off silencer according to claim 1 wherein said granular energy absorbing particles comprise permeable mineral particles.

5. A blow-off silencer for use on a fluid-discharge passage, for passing a fluid stream to ambient, comprising:
   a generally cylindrical housing having a cross sectional area greater than that of said passage and adapted to be connected to receive said fluid stream;
   a diffuser unit affixed at one end of said housing for receiving said fluid stream and for dividing said stream into a multiplicity of separate fluid streams;
   a perforated liner, spaced apart from a portion of said housing at said one end, to define an annular space between said housing and said liner;
   a pack of granular energy-absorbing particles disposed in said annular space to contact said housing; and
   a substantially cylindrical energy-absorbing structure fixed adjacent said housing and extending above said pack to a location adjacent the opposed end of said housing to pass said separate streams from said diffuser unit to ambient, said structure conforming to an interior wall of said housing and further including a terminal annulus of loose granular particles for closing an end of said structure against said fluid streams by contact with said housing.

* * * * *